(12) United States Patent
Yuan et al.

(10) Patent No.: US 11,039,088 B2
(45) Date of Patent: Jun. 15, 2021

(54) VIDEO PROCESSING METHOD AND APPARATUS BASED ON AUGMENTED REALITY, AND ELECTRONIC DEVICE

(71) Applicant: ADVANCED NEW TECHNOLOGIES CO., LTD., Grand Cayman (KY)

(72) Inventors: Feihu Yuan, Hangzhou (CN); Longfei Yu, Hangzhou (CN); Huan Liu, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/798,018

(22) Filed: Feb. 21, 2020

(65) Prior Publication Data

US 2020/0213532 A1    Jul. 2, 2020

Related U.S. Application Data

(63) Continuation of application No. PCT/CN2018/105774, filed on Sep. 14, 2018.

(30) Foreign Application Priority Data

Nov. 15, 2017   (CN) .......................... 201711129714.2

(51) Int. Cl.
*H04N 5/272* (2006.01)
*G06T 7/90* (2017.01)
(Continued)

(52) U.S. Cl.
CPC .............. *H04N 5/272* (2013.01); *G06T 7/70* (2017.01); *G06T 7/90* (2017.01); *H04N 5/23218* (2018.08)

(58) Field of Classification Search
CPC ...... H04N 5/272; H04N 5/23218; G06T 7/90; G06T 7/70
(Continued)

(56) References Cited

U.S. PATENT DOCUMENTS

| 5,335,293 | A | * | 8/1994 | Vannelli ................. G01N 21/88 209/581 |
| 5,384,912 | A |   | 1/1995 | Ogrinc et al. |

(Continued)

FOREIGN PATENT DOCUMENTS

| CN | 103559713 A | 2/2014 |
| CN | 105184838 A | 12/2015 |

(Continued)

OTHER PUBLICATIONS

First Search Report for Chinese Application No. 201711129714.2, dated Mar. 4, 2019, 1 page.
(Continued)

*Primary Examiner* — Mark Roz

(57) ABSTRACT

A method for video processing based on augmented reality comprises: acquiring an image; recognizing a target object in the image; obtaining a video file associated with the target object; recognizing a foreground portion and a background portion of a video frame in the video file; configuring alpha channel values for pixels corresponding to the foreground portion and pixels corresponding to the background portion of the video frame, to make the background portion of the video frame transparent; determining a position of the foreground portion of the video frame in the image; and synthesizing the video frame with the image based on the position of the foreground portion of the video frame in the image to obtain a synthesized video frame.

16 Claims, 4 Drawing Sheets

(51) Int. Cl.
 *G06T 7/70* (2017.01)
 *H04N 5/232* (2006.01)
(58) Field of Classification Search
 USPC .......................................................... 382/284
 See application file for complete search history.

(56) References Cited

U.S. PATENT DOCUMENTS

| | | | |
|---|---|---|---|
| 5,469,536 A | 11/1995 | Blank | |
| 6,020,931 A | 2/2000 | Bilbrey et al. | |
| 7,460,731 B2 | 12/2008 | Senftner et al. | |
| 8,125,521 B2 | 2/2012 | Itokawa | |
| 9,477,965 B2 | 10/2016 | Popkiewicz et al. | |
| 9,934,439 B1 | 4/2018 | Li | |
| 10,127,724 B2 | 11/2018 | Carre et al. | |
| 2001/0005208 A1 | 6/2001 | Minami et al. | |
| 2003/0086018 A1 | 5/2003 | Berman et al. | |
| 2004/0071368 A1* | 4/2004 | Chadha | G06F 16/50 382/305 |
| 2007/0005795 A1 | 1/2007 | Gonzalez | |
| 2008/0030621 A1* | 2/2008 | Ciudad | H04N 7/147 348/586 |
| 2008/0152245 A1 | 6/2008 | El-Maleh et al. | |
| 2009/0289956 A1 | 11/2009 | Douris et al. | |
| 2009/0315978 A1 | 12/2009 | Wurmlin et al. | |
| 2011/0008017 A1 | 1/2011 | Gausereide | |
| 2011/0317009 A1* | 12/2011 | Kumaraswamy | G06K 9/00744 348/143 |
| 2014/0002677 A1* | 1/2014 | Schinker | H04N 5/232 348/207.1 |
| 2014/0253743 A1 | 9/2014 | Loxam et al. | |
| 2014/0328574 A1 | 11/2014 | Sandberg et al. | |
| 2015/0178320 A1 | 6/2015 | Gao et al. | |
| 2015/0242688 A1 | 8/2015 | Knight et al. | |
| 2015/0279106 A1* | 10/2015 | Blanchflower | G06F 3/1462 345/2.2 |
| 2015/0348329 A1 | 12/2015 | Carre et al. | |
| 2017/0098332 A1 | 4/2017 | Knight | |
| 2019/0335155 A1 | 10/2019 | Yang et al. | |

FOREIGN PATENT DOCUMENTS

| | | |
|---|---|---|
| CN | 105681684 A | 6/2016 |
| CN | 106204426 A | 12/2016 |
| CN | 106548185 A | 3/2017 |
| CN | 106664376 A | 5/2017 |
| CN | 104574311 B | 8/2017 |
| CN | 107920202 A | 4/2018 |
| CN | 105830092 B | 7/2019 |
| DE | 69837366 T2 | 12/2007 |
| EP | 2896200 A1 | 7/2015 |
| ES | 2712375 T3 | 5/2019 |
| JP | 2014211879 A | 11/2014 |
| KR | 101036783 B1 | 5/2011 |
| KR | 20110119146 A | 11/2011 |
| RU | 2460233 C2 | 8/2012 |
| TW | I228934 B | 3/2005 |
| TW | I229559 B | 3/2005 |

OTHER PUBLICATIONS

First Office Action for Chinese Application No. 201711129714.2, dated Mar. 12, 2019, 11 pages.
Second Office Action for Chinese Application No. 201711129714.2, dated Oct. 14, 2019, 9 pages.
First Search Report for Taiwanese Application No. 107132054, dated Sep. 17, 2019, 1 page.
International Search Report and Written Opinion of the International Searching Authority for International Application No. PCT/CN2018/105774, dated Nov. 26, 2018, with partial machine English translation, 9 pages.
International Preliminary Report on Patentability Chapter I for PCT Application No. PCT/CN2018/105774 dated May 28, 2020.
Search Report for European Application No. 18878950.7, dated Jul. 20, 2020, 7 pages.
First Examination Report for Indian Application No. 202047011132 dated Apr. 6, 2021.

* cited by examiner

VIDEO PROCESSING METHOD AND APPARATUS BASED ON AUGMENTED REALITY, AND ELECTRONIC DEVICE

CROSS-REFERENCE TO RELATED APPLICATIONS

The present application is a continuation application of International Patent Application No. PCT/CN2018/105774, filed on Sep. 14, 2018, and entitled "VIDEO PROCESSING METHOD AND APPARATUS BASED ON AUGMENTED REALITY, AND ELECTRONIC DEVICE." The PCT application is based on and claims priority to the Chinese Patent Application No. 201711129714.2, filed on Nov. 15, 2017. All of the above-referenced applications are incorporated herein by reference in their entirety.

TECHNICAL FIELD

The application relates to the field of augmented reality (AR) technology, and in particular, to a method, apparatus, and electronic device for video processing based on augmented reality.

BACKGROUND

AR is a technology for adding a virtual model onto an image captured by a camera module of a device. The AR technology can superimpose a virtual model with a real environment onto the same image so that the two co-exist, thereby bringing users a sensory experience beyond the reality.

SUMMARY

To solve problems existing in related technologies, the specification provides a method, apparatus, and electronic device for video processing based on augmented reality.

According to a first aspect of the embodiments of the specification, a computer-implemented method for video processing based on augmented reality is provided. The method comprises: acquiring an image; recognizing a target object in the image; obtaining a video file associated with the target object; recognizing a foreground portion and a background portion of a video frame in the video file; configuring alpha channel values for pixels corresponding to the foreground portion and pixels corresponding to the background portion of the video frame, to make the background portion of the video frame transparent; determining a position of the foreground portion of the video frame in the image; and synthesizing the video frame with the image based on the position of the foreground portion of the video frame in the image to obtain a synthesized video frame.

In some embodiments, the video file has a specified background color; and recognizing a foreground portion and a background portion of a video frame in the video file comprises: calculating color vectors of pixels corresponding to the foreground portion and pixels corresponding to the background portion of the video frame; calculating a color vector of the specified background color; and comparing the color vector of the specified background color with the color vectors of pixels corresponding to the foreground portion and pixels corresponding to the background portion of the video frame, to determine the foreground portion and the background portion of the video frame.

In some embodiments, configuring alpha channel values for pixels corresponding to the foreground portion and pixels corresponding to the background portion of the video frame, to make the background portion of the video frame transparent comprises: calculating values of distances each between the color vector of the specified background color and a color vector of each of the pixels corresponding to the foreground portion and the pixels corresponding to the background portion of the video frame; modifying the values of the distances within a range; and interpolating the modified values of the distances to obtain the alpha channel values for the pixels corresponding to the foreground portion and the pixels corresponding to the background portion of the video frame.

In some embodiments, modifying the values of the distances within a range comprises: determining whether a value of a distance is outside the range; and in response to determining that the value of the distance is outside the range, changing the value of the distance to be a boundary value of the range that is the closest to the value of the distance.

In some embodiments, recognizing a foreground portion and a background portion of a video frame in the video file further comprises: converting each of the pixels corresponding to the foreground portion and the pixels corresponding to the background portion of the video frame into a YUV color code format.

In some embodiments, recognizing a foreground portion and a background portion of a video frame in the video file comprises: calculating a color vector of a first video frame in the video file by using a histogram to determine the background portion of the video frame.

In some embodiments, the method further comprises: acquiring a virtual component for the target object; and determining a position of the virtual component in the image; and synthesizing the video frame with the image based on the position of the foreground portion of the video frame in the image to obtain a synthesized video frame comprises: synthesizing the video frame and the virtual component with the image based on the position of the foreground portion of the video frame and the position of the virtual component in the image.

In some embodiments, the target object includes a merchant-related image provided by a merchant; and recognizing a target object in the image comprises: comparing the acquired image with the merchant-related image to recognize the target object in the image.

In some embodiments, comparing the image with the merchant-related image to recognize the target object in the image comprises: extracting features of the merchant-related image and features of acquired image; and comparing the features of the merchant-related image and the features of acquired image to determine whether the acquired image includes the merchant-related image.

According to a second aspect of the embodiments of the specification, an apparatus for video processing based on augmented reality is provided. The apparatus comprises: one or more processors and one or more non-transitory computer-readable memories coupled to the one or more processors and configured with instructions executable by the one or more processors to cause the apparatus to perform operations comprising: acquiring an image; recognizing a target object in the image; obtaining a video file associated with the target object; recognizing a foreground portion and a background portion of a video frame in the video file; configuring alpha channel values for pixels corresponding to the foreground portion and pixels corresponding to the background portion of the video frame, to make the background portion of the video frame transparent; determining a position of the foreground portion of the video frame in the image; and synthesizing the video frame with the image based on the position of the foreground portion of the video frame in the image to obtain a synthesized video frame.

According to a third aspect of the embodiments of the specification, a non-transitory computer-readable storage medium is provided. The non-transitory computer-readable storage medium is configured with instructions executable by one or more processors to cause the one or more processors to perform operations comprising: acquiring an image; recognizing a target object in the image; obtaining a video file associated with the target object; recognizing a foreground portion and a background portion of a video frame in the video file; configuring alpha channel values for pixels corresponding to the foreground portion and pixels corresponding to the background portion of the video frame, to make the background portion of the video frame transparent; determining a position of the foreground portion of the video frame in the image; and synthesizing the video frame with the image based on the position of the foreground portion of the video frame in the image to obtain a synthesized video frame.

The embodiments of the specification have the following beneficial effects. By means of video processing based on augmented reality provided in the embodiments of the specification, when a user films a real environment, a target object in which the user is interested can be recognized from a captured image of the real environment; and a video file associated with the target object is further searched for. After a background portion of the video file is processed to become transparent, the video file can be synthesized onto a video image captured by the user, so that the captured image viewed by the user further includes a non-transparent foreground portion of the video file, thereby achieving a better visual effect and a better augmented reality effect.

The general description above and detailed description below are merely examples and illustrative of the specification, which should not be construed as limiting the specification.

BRIEF DESCRIPTION OF THE DRAWINGS

The accompanying drawings herein are incorporated into and constitute a part of the specification, which illustrate embodiments consistent with the specification, and serve to explain the principles of the specification in combination with the specification.

DETAILED DESCRIPTION OF THE INVENTION

Figure 1A:
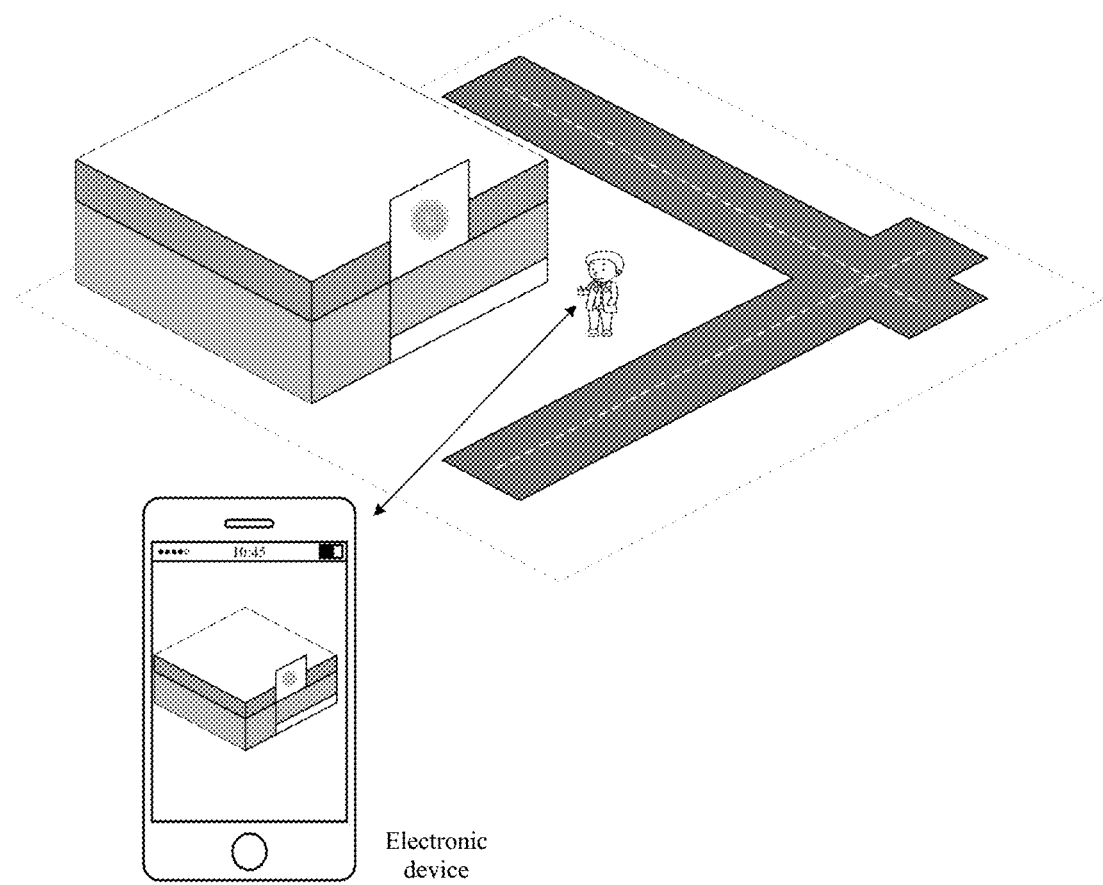
FIG. 1A is a diagram of an application scenario of a video processing method based on augmented reality according to some embodiments of the specification.

Embodiments are described in detail herein, examples of which are illustrated in the drawings. When the following description is related to the drawings, the same numbers in different drawings represent the same or similar elements unless otherwise indicated. The embodiments described below do not represent all embodiments consistent with the specification. Conversely, they are merely examples of apparatuses and methods consistent with some aspects of the specification, as detailed in the attached claims.

Terms used in the specification are aimed at describing embodiments rather than limiting the specification. In the specification and the attached claims, the singular forms "a," "an," and "the" are intended to indicate the plural forms as well, unless the context clearly indicates otherwise. It should also be understood that the term "and/or" used herein refers to and includes any or all possible combinations of one or more associated items listed.

Although terms such as first, second, and third may be used in the specification to describe various information, the information should not be limited by these terms. These terms are used to distinguish one another for information of the same type. For example, without departing from the scope of the specification, first information may also be referred to as second information; and similarly, second information may also be referred to as first information. Depending on the context, the word "if" used herein can be interpreted as "at the time of" or "when" or "in response to determination."

Augmented reality (AR) is a technology that seamlessly integrates real world information with virtual world information, which can apply virtual information to a real environment by virtue of computer technologies, so that the real environment and a virtual object are superimposed in real time in the same image or in the same space to coexist at the same time.

FIG. 1A is a diagram of an application scenario of a video processing method based on augmented reality according to some embodiments of the specification. In FIG. 1A, a smart mobile phone held by a user features a built-in camera module. The user can hold the smart mobile phone to capture a real environment image in which a target object may interest the user. With respect to the target object, a video that interests the user may be provided. For example, in a shopping mall, a merchant may have a video file capturing a product of the merchant, or a video including a spokesperson for the product filmed. If an image of the merchant is captured, the user may have an interest to search for the product or the spokesperson for the product.

Accordingly, video processing based on augmented reality is provided in the embodiments of the specification. A target object in which a user is possibly interested can be recognized from a captured image when the user takes images of a real environment, and a video file associated with the target object is further searched for. After a background portion of the video file is processed to make the background portion of the video frame transparent, the video file can be synthesized onto a video image captured by the user, so that the captured image viewed by the user further includes a non-transparent foreground portion of the video file, thereby achieving a better augmented reality effect and a better visual effect. The embodiments of the specification are described in detail below.

Figure 1B:
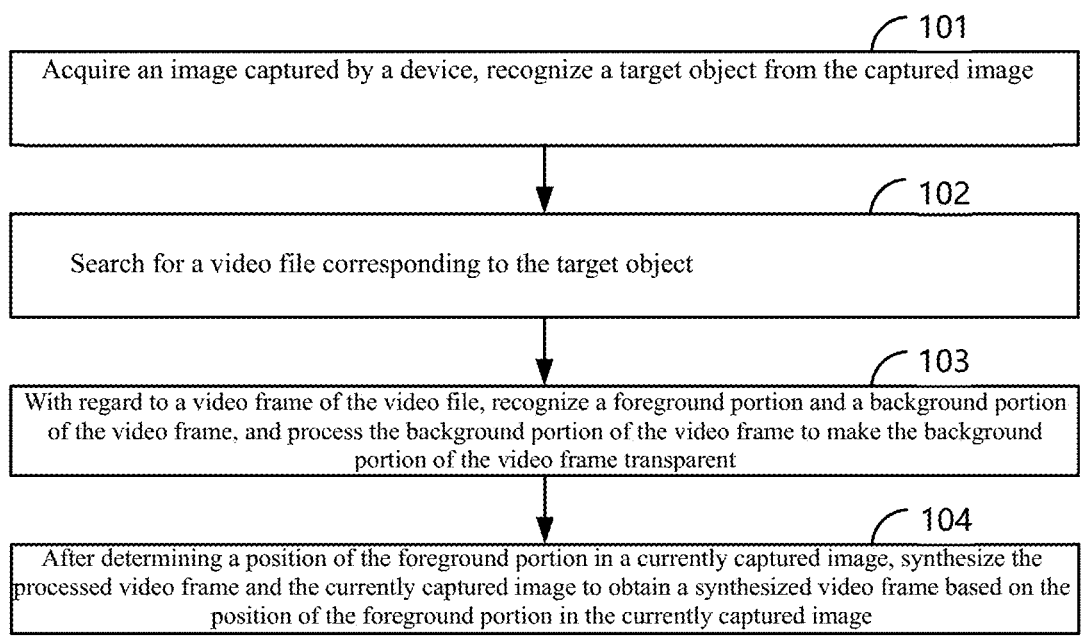
FIG. 1B is a flow chart of a video processing method based on augmented reality according to some embodiments of the specification.

As shown in FIG. 1B, a flow chart of a video processing method based on augmented reality according to some embodiments of the specification is shown. The video processing method is applicable to an electronic device, including the following steps.

In step 101, the method may include acquiring an image captured by a device, and recognizing a target object in the captured image.

In step 102, the method may include searching for a video file associated with the target object.

In step 103, the method may include, with regard to a video frame of the video file, recognizing a foreground portion and a background portion of the video frame, and processing the background portion of the video frame to make the background portion of the video frame transparent.

In step 104, after determining a position of the foreground portion in a currently captured image, the method may include synthesizing the processed video frame with the currently captured image to obtain a synthesized video frame based on the position of the foreground portion in the currently captured image.

In some embodiments, the device may be an electronic device with a filming function, such as a smart mobile phone, a tablet, a personal digital assistant, AR glasses, or an AR helmet. The embodiments of the specification can be applied in various scenarios; and in different application scenarios, the target object in the embodiments of the specification may represent a plurality of different objects. As an example, the embodiments of the specification may be applicable to products provided by an AR service provider; and the target object may be specified in advance by the AR service provider. For example, during the Spring Festival holidays, the target object may be an image of a Chinese character "Fu" (meaning blessing and good fortune). When the product provided by the AR service provider is installed on a smart device held by a user, and the image of the Chinese character "Fu" is recognized in an image captured by the smart device held by the user, the AR service provider can provide a corresponding video file, such as a blessing video from a celebrity. The background of the video file is processed to make the background of the video frame transparent and then synthesized with the captured image, enabling the user to view the blessing from the celebrity on the smart device.

The embodiments of the specification may also be applied in a merchant scenario, and the target object may include a merchant-related image provided in advance by a target merchant, such as a product image or an identification image of the merchant. Depending on the merchant's desire, the merchant may provide a video file such as a product introduction video, a product promotion video, or a video of a product's spokesperson. After a product or merchant identity is recognized from an image captured by a smart device held by the user, the background of the video file is processed to make the background of the video transparent and then synthesized with the captured image, enabling the user to view the product's description, the product's promotion, or the product's spokesperson on the smart device.

The application scenarios described above are examples, and the video processing embodiments provided in the specification is not limited to the scenarios described above. In practical applications, the embodiments of the specification can be flexibly applied in various scenarios as desired.

In some embodiments, data generated during filming by a camera module of the device may include sequences of video frames which are continuously generated and provided to a display module of the device; and the display module displays each frame at a rate of N frames per second. "N" represents a positive integer, e.g., 24, 30, 60, etc. When acquiring the captured image, the device may acquire one video frame, multiple consecutive video frames, or a video file including multiple video frames.

For the captured image, various recognition methods can be used to recognize the target object from the captured image. For example, applicable image recognition algorithms may include, those based on Scale-invariant Feature Transform (SIFT) or Speed Up Robust Features (SURF), based on a Haar-like feature, or based on generalized Hough transformation, etc., which may be flexibly selected according to needs in practical applications and is not limited by the specification.

With respect to providing a related image of the target object, as applied in a merchant scenario where a merchant provides a merchant-related image, recognizing a target object from a captured image comprises: comparing the captured image with the merchant-related image and recognizing the target object from the captured image according to a result of the comparison. As an example, the comparison process may include extracting image features of the merchant-related image and image features of the captured image, comparing the features of the merchant-related image with the features of the captured image to determine whether the captured image includes the merchant-related image, and then recognizing the target object from the captured image according to a result of the comparison.

In some embodiments, an association relationship between the target object and the video file may be established in advance. After the target object is recognized from the captured image, the video file associated with the target object can be located and obtained by searching according to the pre-established association relationship. In other embodiments, a video file associated with the target object may be obtained in other ways, e.g., by web crawling. With regard to video files in practical applications, video frames of some types of video files may carry alpha channels, such as video files in an QuickTime movie format (MOV) format, or an Audio Video Interleaved (AVI) format. For example, an alpha channel may be an 8-bit grayscale channel, which records transparency information of an image by using 256 levels of grayscale, and defines transparent, non-transparent and translucent areas, where "white" means non-transparent, "black" means transparent, and "grey" means translucent. Such types of video files may include a large amount of data. Other types of video files may not carry an alpha channel, such as H264 encoded video files in an MP4 format.

By means of video files with a better compression rate and a smaller amount of data, fast transmission can be achieved. In addition, during video synthesis, audio portions in a video file are not affected by the synthesis, and thus video frames and audio playback of the video file can be in synchrony during subsequent playback.

In a video frame, a foreground portion can be distinguished from a background portion. A foreground in an image is the part of the scene or representation that is in front of and close to a camera lens. For example, a foreground in a captured image may be the part including the target object, such as a product, that is in front of and close to the camera lens. A background may be the part of the image that is behind the object and away from the camera lens. In the embodiments of the specification, the foreground portion, as a portion to be displayed to the user, may be synthesized onto the captured image, while the background portion serves as a portion that may not be displayed to the user and is processed to become transparent, i.e., processing an original video file to obtain a video file having a transparent background.

In some examples, if a photographer of a video file prepares the video file with a single background color, the background color specified by the photographer of the video file can be acquired before the processing for transparency, pixels with colors different from the background color in the video frames are recognized; and accordingly, the foreground portion and the background portion in the video frames can be distinguished. In some embodiments, in order to rapidly make the background transparent, the video file may be specified with a background color; and the specified background color may be flexibly determined according to desires, such as green or blue.

For the video file with the specified background color, recognizing a foreground portion and a background portion of a video frame may comprise: comparing a color vector of the specified background color with color vectors of pixels of the video frame and recognizing the foreground portion and the background portion of the video frame. A video file provider may determine the specified background color according to desires, and capture and provide the video file with the specified background color. Therefore, by comparing the color vector of each pixel in the video frame and the color vector of the background color, the foreground portion and the background portion of the video frame can be quickly recognized. If a photographer does not prepare the video file with a single background color, other methods may be used to distinguish the foreground portion from the background portion. For example, a color vector of a first frame in the video file can be calculated by using a histogram to determine the background portion; or an Alpha Matting technology can be used to distinguish the foreground from the background, and then the background portion is processed to become transparent.

For a video file that carries an alpha channel, alpha channel values of the background portion can be changed after the foreground portion is distinguished from the background portion, to make the background portion transparent. With regard to a video file that does not carry an alpha channel, processing the background portion of the video frame to make the background portion of the video frame transparent comprises: configuring, according to pixels corresponding to the foreground portion and pixels corresponding to the background portion, alpha channel values for pixels of the video frame to make the background portion of the video frame with the configured alpha channel values transparent.

In this way, each pixel (also referred to as "pixel point") carries an alpha channel value, so that the background portion of the video frame can be quickly processed to become transparent without interfering with the original audio portion of the video file.

The above processing process may be performed in advance by a server; or the background portion may be processed by the device to become transparent in a real-time rendering process, so as to achieve the objective of removing the background portion. In some embodiments, a graphics processing unit (GPU) may be used to quickly process video frames. In some embodiments, the GPU can convert and drive display information required by a computing device, and provide a line scanning signal to a display screen to control the correct display of the display screen, serving as an important element connecting the display screen with a core processing chip. The GPU processing method can process large-sized video frames, achieve a real-time effect with a small memory footprint, and can achieve a higher speed of rendering in an AR scenario.

The obtained transparent-background video frame can be synthesized with the captured image to obtain a synthesized video frame. The synthesized video frame can be rendered on the display screen of the device; and accordingly, the user can view the captured image with a video rendered. In some embodiments, before synthesis, the transparent-background video frame can be subject to other related processing. In some examples, the foreground portion may be rotated, scaled, or stretched as desired. In other examples, three-dimensional processing may also be performed. For example, a three-dimensional space plane may be determined according to a three-dimensional effect desired to be displayed, and the processed video frame is rendered onto the three-dimensional space plane to enable the foreground portion to have a three-dimensional effect, such as a shadow effect or a depth-of-field effect.

In some embodiments, in order to further enhance the augmented reality effect of the embodiments, a virtual component can be also added to the captured image according to the embodiments of the specification. For example, a virtual component may be a computer-generated two dimensional or three dimensional object that can be synthesized with images or other virtual objects. The virtual component may be in a static form or a dynamic form. A motion state of the virtual component in a dynamic form may be changed by the device according to a set motion rule or adjusted according to changes of some targets recognized from the captured image, or the like. The construction of the virtual component can be flexibly set according to desires, which is not limited by the embodiments. Where the virtual component is involved, the method provided by the embodiments of the specification may further comprise: acquiring a virtual component for the target object. Synthesizing, after determining the position of the foreground portion in a currently captured image, the processed video frame with the currently captured image comprises: synthesizing, after respectively determining the positions of the foreground portion and of the virtual component in the currently captured image, the processed video frame and the virtual component with the currently captured image based on the positions of the foreground portion and the virtual component in the currently captured image.

In this way, some virtual components can be rendered on the synthesized video frame during synthesis, thereby improving the augmented reality effect.

Figure 2:
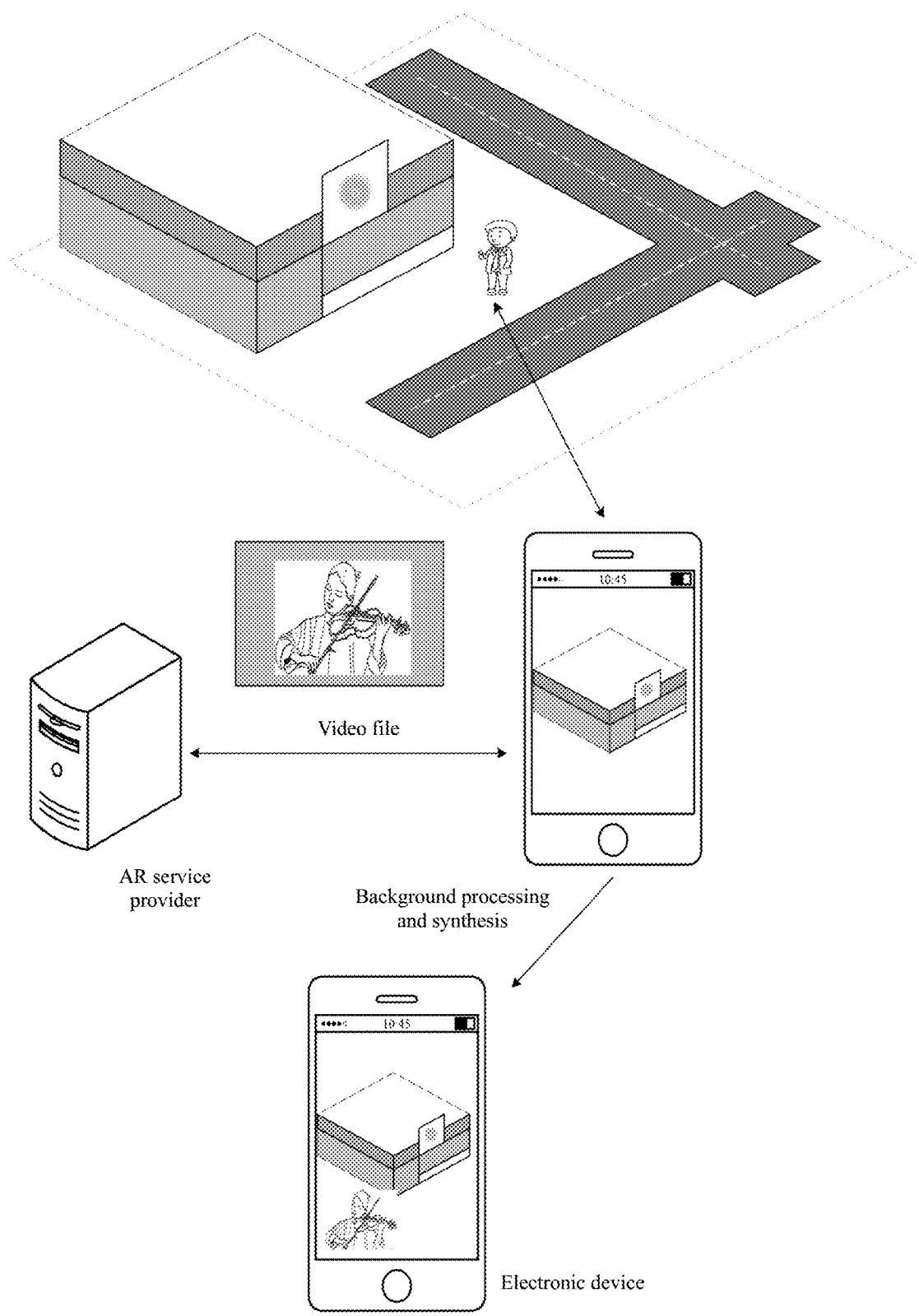
FIG. 2 is a schematic diagram of video processing based on augmented reality according to some embodiments of the specification.

The video processing based on augmented reality provided by the specification are described in detail by using embodiments. FIG. 2 is a schematic diagram of video processing based on augmented reality according to some embodiments of the specification. In the embodiments, the application in a merchant scenario is taken as an example for description. An AR service provider may provide an application (APP) with an AR function to a user, and the user can install the APP on an electronic device.

A merchant can provide the AR service provider with a video file prepared thereby; and the video file may relate to a product and a brand of the merchant. The embodiments of the specification use a video file, which can have a high compression rate during transmission, require less traffic, and ensure audio and video synchronization during real-time rendering when being applied in an AR scenario. The video file may be one that does not carry alpha channel values. Such a video file is easy to capture, and has a small data size and a fast transmission speed. Further, in order to process videos more quickly, the AR service provider can specify a background color, and the merchant provides a video file with the specified background color; that is, the background portion of the video file is in a single color. In addition, the merchant can also provide the AR service provider with a merchant-related image so that when an image captured by the user is acquired by the APP, the merchant is recognized in the captured image.

The AR service provider can acquire a video file and a merchant-related image provided by each merchant and establish a correspondence among the three.

In FIG. 2, a camera module is built in a smart device held by the user, and the user can hold the smart mobile phone to capture an image in a real environment. The APP provided by the AR service provider may be installed in the smart device. The smart device can implement the following steps.

At first, the smart device may be configured to recognize a merchant. Through an image captured by the device, the smart device may be configured to compare the captured image with the merchant-related image played back in the video of each merchant to recognize the merchants who provides the merchant-related image in the captured image.

Secondly, the smart device may be configured to read video files and configurations. According to the recognized merchant, the smart device may be configured to search for a corresponding video file and obtain a background color of the video file.

Thirdly, the smart device may be configured to read video frames. The smart device may be configured to read a video file, decode the video file into video frames, and send the video frames to a GPU. The video frames may be data in an RGB format.

The smart device may be configured to calculate a full alpha channel by using the GPU. Calculating a full alpha channel by using the GPU may include: i. converting each pixel in a video frame into a YUV color code (YCrCb) format, and calculating a color vector of each pixel:

float Y=0.2989*color.r+0.5866*color.g+0.1145*color.b;
float Cr=0.7132*(color.r−Y);
float Cb=0.5647*(color.b−Y);
return vec2 (Cr, Cb);

ii, calculating a color vector of the specified background color in the same way; iii. calculating the distance between the color vector of each pixel and the color vector of the specified background color; and iv. first using Clamping (i.e., an algorithm that modifies a numerical value to be within a range and changes the numerical value to be the closest boundary value of the range when the numerical value is outside the range) to change the values of the distances between the color vectors of the pixels and the color vector of the specified background color respectively to be within a range, then using Hermite (a smooth interpolation algorithm) to interpolate a result (e.g., the changed values of the distances within the range), and using the result of the interpolation (e.g., interpolated values of the distances within the range) as alpha channel values each for a respective pixel.

Lastly, the smart device may be configured to perform synthesis. After the alpha channel value is configured, the background portion of the video frame becomes transparent, while the foreground portion remains unchanged. The video frame obtained in this way can be deemed as a transparent texture carrying an alpha channel. According to desires, the video file can be subject to other related processing. In some examples, the foreground portion may be rotated, scaled, or stretched as desired. In other examples, three-dimensional processing may also be performed. For example, a three-dimensional space plane may be determined according to a three-dimensional effect desired to be displayed, and the processed video frame is rendered onto the three-dimensional space plane to enable the foreground portion to have a three-dimensional effect, such as a shadow effect or a depth-of-field effect.

In some embodiments, the image captured by the camera module and the video frame processed to have a transparent background are processed by alpha synthesis, thereby achieving the objective of merging the foreground portion of the video file with a real environment image captured by using the camera module. In some embodiments, the merchant may further provide a virtual component based on desires; and the AR service provider can configure some virtual components. During synthesis, the virtual components are rendered onto the synthesized video frame, thereby enhancing the augmented reality effect.

Corresponding to the above-described video processing method embodiments based on augmented reality, the specification further provides various embodiments of a video processing apparatus based on augmented reality and an electronic device to which the video processing apparatus is applied.

Figure 3:
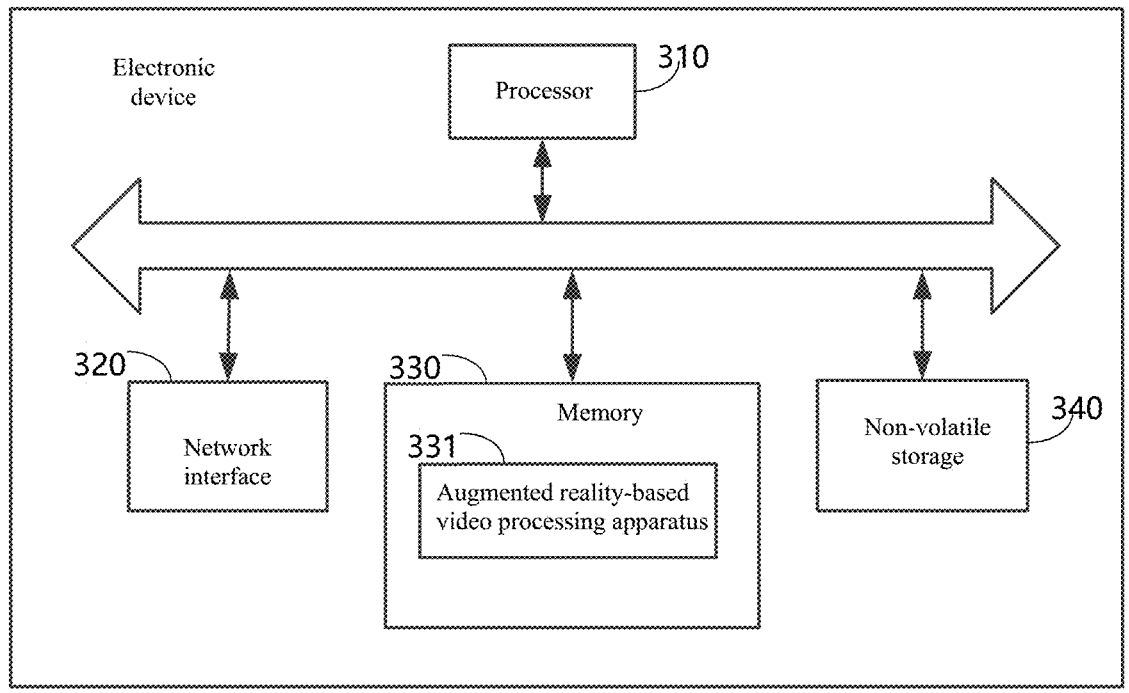
FIG. 3 is a hardware structural diagram of an electronic device in which a video processing apparatus based on augmented reality is located according to some embodiments of the specification.

The embodiments of the video processing apparatus based on augmented reality in the specification are applicable to the electronic device. The embodiments may be implemented by software, hardware, or a combination of software and hardware. For example, in the software implementation, the apparatus in a logical sense is formed through reading, by a video processor for performing video processing based on augmented reality in which the apparatus is located, corresponding computer program instructions in a non-volatile storage into a memory for execution. In the level of hardware, FIG. 3 is a hardware structural diagram of an electronic device in which an apparatus for video processing based on augmented reality is located according to the specification. In addition to a processor 310, a memory 330, a network interface 320, and a non-volatile storage 340, as shown in FIG. 3, the electronic device in which the apparatus 331 of the embodiments is located may further comprise other hardware depending on actual functions of the electronic device. Details are not elaborated herein.

Figure 4:
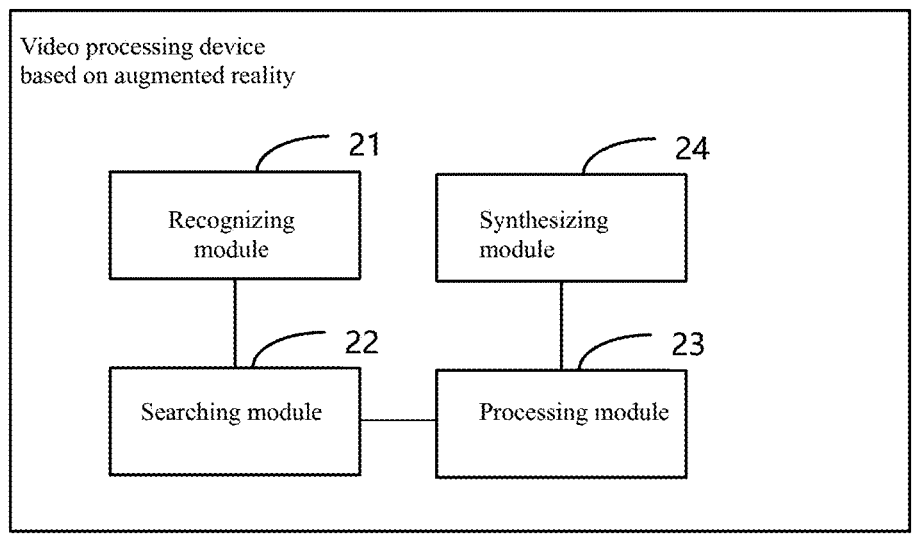
FIG. 4 is a block diagram of a video processing apparatus based on augmented reality according to some embodiments of the specification.

As shown in FIG. 4, a block diagram of a video processing apparatus based on augmented reality according to some embodiments of the specification is illustrated. The apparatus comprises: an recognizing module 41, configured to acquire an image captured by a device, and recognize a target object from the captured image; a searching module 42, configured to search for a video file associated with the target object; a processing module 43, configured to recognize, with regard to a video frame of the video file, a foreground portion and a background portion of the video frame, and process the background portion of the video frame to make the background portion of the video frame transparent; and a synthesizing module 44, configured to synthesize, after determining the position of the foreground portion in a currently captured image, the processed video frame with the currently captured image to obtain a synthesized video frame based on the position of the foreground portion in the currently captured image.

In some embodiments, the video file is a video file with a specified background color; and the recognizing module 41 is further configured to: compare a color vector of the specified background color with color vectors of pixels of the video frame, to recognize the foreground portion and the background portion of the video frame. In some embodiments, with regard to a video file that does not carry an alpha channel, the processing module 43 is further configured to: configure, according to pixels corresponding to the foreground portion and pixels corresponding to the background portion, alpha channel values for pixels of the video frame to make the background portion of the video frame with the configured alpha channel values transparent. In some embodiments, the processing module 43 operates in a graphics processor.

In some embodiments, the apparatus further comprises: an acquiring module (not shown in FIG. 4), configured to acquire a virtual component for the target object; and the synthesizing module 44 is further configured to: synthesize, after respectively determining the positions of the foreground portion and of the virtual component in the currently captured image, the processed video frame and the virtual component with the currently captured image based on the positions of the foreground portion and of the virtual component in the currently captured image.

In some embodiments, the target object includes a merchant-related image provided in advance by a target merchant; and the recognizing module 41 is further configured to: compare the captured image with the merchant-related image and recognize the target object from the captured image according to a result of the comparison.

Correspondingly, embodiments of the specification further provide an electronic device, comprising: a processor; and a memory configured to store processor-executable instructions. The instructions, when executed by the processor, may cause the process to: acquire an image captured by a device, and recognize a target object from the captured image; search for a video file associated with the target object; recognize, with regard to a video frame of the video file, a foreground portion and a background portion of the video frame, and process the background portion of the video frame to make the background portion of the video frame transparent; and synthesize, after determining the position of the foreground portion in a currently captured image, the processed video frame with the currently captured image based on the position of the foreground portion in the currently captured image to obtain a synthesized video frame.

For details about the implementation process of functions and effects of each module in the above-described apparatus, the implementation process of the corresponding steps in the above-described methods may be referenced. Details are not elaborated herein again.

Since the apparatus embodiments basically correspond to the method embodiments, for relevant portions, reference may be made to the descriptions in the method embodiments. The above-described apparatus embodiments are examples. Modules described as separate components may or may not be physically separated, and components displayed as modules may or may not be physical modules; that is, they may be located at one place or be distributed on multiple network modules. Some or all of the modules may be selected according to actual needs to achieve the objectives of the embodiments in the specification. Those skilled in the art can understand and implement the embodiments without creative efforts.

The embodiments of the specification are described above. Other embodiments are within the scope of the attached claims. In some embodiments, actions or steps in the claims may be performed in a sequence different from that in the described embodiments and the desired results can still be achieved. In addition, the desired results can still be achieved if the processes described in the drawings are not necessarily performed in the illustrated sequence or a continuous sequence. In some implementations, multitasking and parallel processing are also feasible or may be advantageous.

Those skilled in the art may readily think of other embodiments of the specification after considering the specification and practicing the embodiments described herein. The specification is intended to encompass any variations, uses, or adaptation of the specification. These variations, uses, or adaptations follow the general principles of the specification and include the common general knowledge or common technical means in the technical field that is not described in the specification. The specification and the embodiments disclosed herein are considered as examples, and the real scope and spirit of the specification are indicated by the following claims.

It should be understood that the specification is not limited to the precise structure that has been described above and illustrated in the accompanying drawings, and various modifications and changes can be made without departing from the scope thereof. The scope of the specification is limited merely by the attached claims.

The above embodiments are some embodiments of the specification and are not intended to limit the specification. Any modification, equivalent replacement, or improvement made within the spirit and principles of the specification shall fall within the protection scope of the specification.

The invention claimed is:

1. A computer-implemented method for video processing, comprising:
   receiving a merchant-related image;
   acquiring an image;
   recognizing a target object from the image by comparing the image with the merchant-related image, wherein the merchant-related image includes the target object;
   obtaining a video file associated with the target object, wherein the video file has a specified background color and does not contain an alpha channel;
   recognizing a foreground portion and a background portion of a video frame in the video file;
   changing the background portion of the video frame to transparent by configuring alpha channel values for pixels corresponding to the foreground portion and pixels corresponding to the background portion of the video frame, wherein configuring the alpha channel values comprises:
      determining values of distances each between a color vector of the specified background color of the video file and a color vector of each of the pixels corresponding to the foreground portion and each of the pixels corresponding to the background portion of the video frame,
      modifying the values of the distances within a range, and
      interpolating the modified values of the distances to obtain the alpha channel values for the pixels corresponding to the foreground portion and the pixels corresponding to the background portion of the video frame;
   determining a position of the foreground portion of the video frame in the image based at least on changing the background portion of the video frame to transparent; and
   synthesizing the video frame with the image based on the position of the foreground portion of the video frame in the image to obtain a synthesized video frame.

2. The method according to claim 1, wherein recognizing a foreground portion and a background portion of a video frame in the video file comprises:

calculating the color vectors of the pixels corresponding to the foreground portion and the pixels corresponding to the background portion of the video frame;
calculating the color vector of the specified background color; and
comparing the color vector of the specified background color with the color vectors of the pixels corresponding to the foreground portion and the pixels corresponding to the background portion of the video frame, to determine the foreground portion and the background portion of the video frame.

3. The method according to claim 2, wherein modifying the values of the distances within a range comprises:
determining whether a value of a distance is outside the range; and
in response to determining that the value of the distance is outside the range, changing the value of the distance to be a boundary value of the range that is the closest to the value of the distance.

4. The method according to claim 2, wherein recognizing a foreground portion and a background portion of a video frame in the video file further comprises: converting each of the pixels corresponding to the foreground portion and the pixels corresponding to the background portion of the video frame into a YUV color code format.

5. The method according to claim 1, wherein recognizing a foreground portion and a background portion of a video frame in the video file comprises:
calculating a color vector of a first video frame in the video file by using a histogram to determine the background portion of the video frame.

6. The method according to claim 1, further comprising:
acquiring a virtual component for the target object; and
determining a position of the virtual component in the image; and
wherein synthesizing the video frame with the image based on the position of the foreground portion of the video frame in the image to obtain a synthesized video frame comprises:
synthesizing the video frame and the virtual component with the image based on the position of the foreground portion of the video frame and the position of the virtual component in the image.

7. The method according to claim 1, wherein comparing the image with the merchant-related image to recognize the target object in the image comprises:
extracting features of the merchant-related image and features of acquired image; and
comparing the features of the merchant-related image and the features of acquired image to determine whether the acquired image includes the merchant-related image.

8. An apparatus for video processing, comprising one or more processors and one or more non-transitory computer-readable memories coupled to the one or more processors and configured with instructions executable by the one or more processors to cause the apparatus to perform operations comprising:
receiving a merchant-related image;
acquiring an image;
recognizing a target object from the image by comparing the image with the merchant-related image, wherein the merchant-related image includes the target object;
obtaining a video file associated with the target object, wherein the video file has a specified background color and does not contain an alpha channel;
recognizing a foreground portion and a background portion of a video frame in the video file;
changing the background portion of the video frame to transparent by configuring alpha channel values for pixels corresponding to the foreground portion and pixels corresponding to the background portion of the video frame, wherein configuring the alpha channel values comprises:
determining values of distances each between a color vector of the specified background color of the video file and a color vector of each of the pixels corresponding to the foreground portion and each of the pixels corresponding to the background portion of the video frame,
modifying the values of the distances within a range, and
interpolating the modified values of the distances to obtain the alpha channel values for the pixels corresponding to the foreground portion and the pixels corresponding to the background portion of the video frame;
determining a position of the foreground portion of the video frame in the image based at least on changing the background portion of the video frame to transparent; and
synthesizing the video frame with the image based on the position of the foreground portion of the video frame in the image to obtain a synthesized video frame.

9. The apparatus according to claim 8, wherein recognizing a foreground portion and a background portion of a video frame in the video file comprises:
calculating the color vectors of the pixels corresponding to the foreground portion and the pixels corresponding to the background portion of the video frame;
calculating the color vector of the specified background color; and
comparing the color vector of the specified background color with the color vectors of the pixels corresponding to the foreground portion and the pixels corresponding to the background portion of the video frame, to determine the foreground portion and the background portion of the video frame.

10. The apparatus according to claim 9, wherein modifying the values of the distances within a range comprises:
determining whether a value of a distance is outside the range; and
in response to determining that the value of the distance is outside the range, changing the value of the distance to be a boundary value of the range that is the closest to the value of the distance.

11. The apparatus according to claim 9, wherein recognizing a foreground portion and a background portion of a video frame in the video file further comprises:
converting each of the pixels corresponding to the foreground portion and the pixels corresponding to the background portion of the video frame into a YUV color code format.

12. The apparatus according to claim 8, wherein recognizing a foreground portion and a background portion of a video frame in the video file comprises:
calculating a color vector of a first video frame in the video file by using a histogram to determine the background portion of the video frame.

13. The apparatus according to claim 8, the operations further comprise:
acquiring a virtual component for the target object; and
determining a position of the virtual component in the image; and wherein synthesizing the video frame with the image based on the position of the foreground portion of the video frame in the image to obtain a synthesized video frame comprises:
synthesizing the video frame and the virtual component with the image based on the position of the foreground portion of the video frame and the position of the virtual component in the image.

14. The apparatus according to claim 8, wherein comparing the image with the merchant-related image to recognize the target object in the image comprises:
extracting features of the merchant-related image and features of acquired image; and
comparing the features of the merchant-related image and the features of acquired image to determine whether the acquired image includes the merchant-related image.

15. A non-transitory computer-readable storage medium configured with instructions executable by one or more processors to cause the one or more processors to perform operations comprising:
receiving a merchant-related image;
acquiring an image;
recognizing a target object from the image by comparing the image with the merchant-related image, wherein the merchant-related image includes the target object;
obtaining a video file associated with the target object, wherein the video file has a specified background color and does not contain an alpha channel;
recognizing a foreground portion and a background portion of a video frame in the video file;
changing the background portion of the video frame to transparent by configuring alpha channel values for pixels corresponding to the foreground portion and pixels corresponding to the background portion of the video frame, wherein configuring the alpha channel values comprises:
determining values of distances each between a color vector of the specified background color of the video file and a color vector of each of the pixels corresponding to the foreground portion and each of the pixels corresponding to the background portion of the video frame,
modifying the values of the distances within a range, and
interpolating the modified values of the distances to obtain the alpha channel values for the pixels corresponding to the foreground portion and the pixels corresponding to the background portion of the video frame;
determining a position of the foreground portion of the video frame in the image based at least on changing the background portion of the video frame to transparent; and
synthesizing the video frame with the image based on the position of the foreground portion of the video frame in the image to obtain a synthesized video frame.

16. The non-transitory computer-readable storage medium according to claim 15, wherein
recognizing a foreground portion and a background portion of a video frame in the video file comprises:
calculating the color vectors of the pixels corresponding to the foreground portion and the pixels corresponding to the background portion of the video frame;
calculating the color vector of the specified background color; and
comparing the color vector of the specified background color with the color vectors of the pixels corresponding to the foreground portion and the pixels corresponding to the background portion of the video frame, to determine the foreground portion and the background portion of the video frame.

* * * * *